(12) United States Patent
Augier et al.

(10) Patent No.: US 11,117,109 B2
(45) Date of Patent: Sep. 14, 2021

(54) MIXING AND DISTRIBUTION DEVICE WITH LONGITUDINAL OPENING

(71) Applicant: IFP Energies nouvelles, Rueil-Malmaison (FR)

(72) Inventors: Frederic Augier, Saint Symphorien D Ozon (FR); Philippe Beard, Saint Genis-Laval (FR); Cecile Plais, Les Haies (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 16/755,317

(22) PCT Filed: Sep. 28, 2018

(86) PCT No.: PCT/EP2018/076546
§ 371 (c)(1),
(2) Date: Apr. 10, 2020

(87) PCT Pub. No.: WO2019/072601
PCT Pub. Date: Apr. 18, 2019

(65) Prior Publication Data
US 2021/0197159 A1 Jul. 1, 2021

(30) Foreign Application Priority Data
Oct. 12, 2017 (FR) .................................... 17/59.551

(51) Int. Cl.
*B01J 8/04* (2006.01)
(52) U.S. Cl.
CPC .......... *B01J 8/0492* (2013.01); *B01J 8/0453* (2013.01); *B01J 2208/0092* (2013.01); *B01J 2208/00849* (2013.01); *B01J 2208/00929* (2013.01); *B01J 2208/00938* (2013.01)

(58) Field of Classification Search
CPC .................... B01J 8/0492; B01J 8/0453; B01J 2208/00849; B01J 2208/00938; B01J 2208/00336; B01J 2208/00362; B01J 2208/00371
See application file for complete search history.

(56) References Cited

U.S. PATENT DOCUMENTS 9,321,023 B2  4/2016  Xu
9,764,299 B2  9/2017  Beard et al.

FOREIGN PATENT DOCUMENTS

FR   3034323 A1   10/2016
WO   14210276 A1  12/2014

OTHER PUBLICATIONS

International Search Report PCT/EP2018/076546 dated Dec. 5, 2018 (pp. 1-11).

*Primary Examiner* — Lessanework Seifu
(74) *Attorney, Agent, or Firm* — Millen, White, ZeLano & Branig; Brion P. Heaney

(57) ABSTRACT

Fluid mixing and distribution device for a downflow catalytic reactor, the said device comprising a mixing zone comprising at least one fluid-mixing space of length L1' and a fluid-exchange space of length L2', situated underneath and superposed with said mixing space, it being understood that the length L2' of the said exchange space is strictly greater than the length L1' of the said mixing space so as to create a roof at the level of the said exchange space, the said roof comprising at least one longitudinal opening suited to the passage of the following its from the said exchange space to the said distribution zone.

20 Claims, 6 Drawing Sheets

MIXING AND DISTRIBUTION DEVICE WITH LONGITUDINAL OPENING

TECHNICAL FIELD

The present invention applies in the field of exothermic reactions and relates more particularly to hydrotreating, hydrodesulfurization, hydrodenitrogenation, hydrocracking, hydrogenation, hydrodeoxygenation, hydroisomerization, hydrodewaxing or hydrodearomatization reactions carried out in a fixed bed reactor. The invention relates more particularly to a device for mixing and distributing fluids in a cocurrent downflow reactor and to the use thereof for carrying out exothermic reactions.

PRIOR ART

Exothermic reactions carried out for example in refining and/or in petrochemistry need to be cooled by an additional fluid, referred to as quench fluid, in order to avoid thermal runaway of the catalytic reactor in which they are carried out. The catalytic reactors used for these reactions generally comprise at least one solid catalyst bed. The exothermic nature of the reactions makes it necessary to maintain a homogeneous axial temperature gradient over the reactor cross section, and a radial temperature gradient close to zero within the reactor so as to avoid the existence of hot spots in the catalyst bed contained in the reactor. Zones that are too hot can prematurely reduce the activity of the catalyst and/or lead to nonselective reactions and/or lead to thermal runaway. Therefore, it is important to have at least one mixing chamber in a reactor, said mixing chamber being situated between two catalyst beds, allowing a homogeneous temperature distribution in the fluids over a reactor cross section and cooling of the reaction fluids to a desired temperature.

In order to effect this homogenization, a person skilled in the art often has to use a specific arrangement of internals that are often complex, involving the introduction of quench fluid that is as homogeneous as possible over the cross section of the reactor. For example, document FR 2 824 495 A1 describes a quenching device that makes it possible to ensure effective heat exchange between the quench fluid(s) and the process fluid(s). This device is incorporated into a chamber and comprises a tube for injecting the quench fluid, a baffle for collecting the fluids, the quenching box itself, effecting the mixing between the quench fluid and the downwardly-flowing reaction fluid, and a distribution system made up of a perforated dish and of a distribution plate. The quenching box has a deflector for setting the fluids into swirling movement in a substantially nonradial direction not parallel to the axis of said chamber and downstream of the deflector, in the direction of flow of the reaction fluid, and at least one outlet passage section for the mixture of fluids formed in the box. This device makes it possible to alleviate certain disadvantages of the various systems of the prior art, but remains bulky.

In order to overcome the problem of bulkiness, a device for mixing fluids in a downflow reactor has been developed, and is described in document FR 2 952 835 A1. This device comprises a horizontal collection means provided with a vertical collecting pipe to receive the fluids, an injection means positioned in the collecting pipe, and an annular mixing chamber of circular cross section situated downstream of the collecting means in the direction of flow of the fluids. The mixing chamber comprises an inlet end connected to the collecting pipe and an outlet end allowing the fluids to pass, as well as a horizontal pre-distribution plate comprising at least one chimney. The advantage of this device is that it is more compact than the one described earlier, and makes it possible to achieve good mixing of the fluids and good homogeneity of temperature.

With a view to reducing the bulkiness of the mixing and distribution device still further, another solution proposed in document FR 3 034 323 is to produce a fluid mixing and distribution device in which the mixing zone and the fluid distribution zone are situated at the same level. Such a device is depicted in FIGS. 1a to 1c and will be described in greater detail hereinafter. More particularly, the mixing zone comprises a fluid mixing chamber and a fluid exchange chamber, which is connected to, and in communication with, the mixing chamber. The mixing chamber is preferably situated above the exchange chamber. Thus, the configuration of the mixing zone makes it possible for the fluids to be mixed in the mixing chamber and for said mixture to flow to the exchange chamber. The mixing between the reaction fluid and the quench fluid continues to take place in the exchange chamber and then heads toward the distribution plate, passing via the lateral passage sections situated on the walls of the exchange chamber. However, when the quench fluid and/or the reaction fluid is of the gas type, too great a gas flow may drive fluids of liquid and/or liquid/gas type onto the distribution plate and dry certain zones of said plate. As a result, the chimneys of the distribution plate will not all be fed in an equivalent manner and this may result in imbalance in the flow rate at the catalyst bed situated downstream of said distribution plate.

One object of the present invention seeks to overcome this problem by proposing a mixing and distribution device that allows better distribution of the fluids across the distribution plate.

SUBJECTS OF THE INVENTION

A first subject of the invention relates to a device for mixing and distributing fluids for a downflow catalytic reactor, said device comprising:
  at least one collecting zone (A) comprising at least one collecting means;
  at least one substantially vertical collecting pipe that is able to receive a reaction fluid collected by said collecting means and at least one injection means opening into said collecting pipe in order to inject a quench fluid;
  at least one mixing zone (B), situated downstream of said collecting pipe in the direction of flow of the fluids, said mixing zone (B) comprising at least one fluid mixing chamber of length L1', said mixing zone comprising a first end in communication with said collecting pipe and a second end in communication with a fluid exchange chamber of length L2', situated underneath and superposed on said mixing chamber;
  at least one distribution zone (C) situated at the same level as the mixing zone (B), downstream of said mixing zone (B) in the direction of flow of the fluids, said distribution zone (C) comprising a distribution plate supporting a plurality of chimneys;
  characterized in that the length L2' of said exchange chamber is strictly greater than the length L1' of said mixing chamber so as to create a ceiling on said exchange chamber, said ceiling comprising at least one longitudinal opening suitable for the passage of the fluids from said exchange chamber to said distribution zone (C).

Preferably, the ratio between the length L1' of the mixing chamber and the length L2' of the exchange chamber is between 0.1 and 0.9.

Advantageously, the ratio between the surface area of the ceiling and the surface area of the longitudinal opening(s) is between 0.2 and 1.

Preferably, the ratio between the surface area of the ceiling and the surface area of the longitudinal opening(s) is equal to 1.

Advantageously, the device further comprises at least one plurality of horizontal panels situated in the distribution zone (C), underneath the opening in the ceiling of the exchange chamber, and above the chimneys or on the chimneys of the distribution plate.

Advantageously, said horizontal panels are situated at a height of between 0 and 10 cm above the chimneys of the distribution plate.

Preferably, said horizontal panels are spaced apart from one another by a distance of between 0 and 5 cm.

Preferably, said exchange chamber also comprises, on its lateral walls, a plurality of lateral passage sections suitable for the passage of the fluids from said exchange chamber to said distribution zone (C).

Advantageously, the device further comprises at least one lateral deflector situated in said distribution zone (C) opposite at least one lateral passage section.

Advantageously, the device comprises a pair of lateral deflectors situated one on each side of the exchange chamber.

Preferably, said mixing zone (B) is off-center with respect to the central axis of the distribution zone (C), forming on the distribution plate two zones (Z1) and (Z2) of which the ratio R, defined as the ratio between the surface area of the zone (Z1) and the zone (Z2), is between 0 and 1, excluding the values 0 and 1.

Advantageously, the mixing chamber comprises a bottom having an end edge that has a beveled shape and forms an angle θ of between 20° and 70° with the longitudinal axis XX' of the mixing chamber (15).

Preferably, the volume ratio between said exchange chamber and said mixing chamber is between 5 and 60%.

Preferably, the exchange chamber is situated at a distance "d" of between 20 and 150 mm away from the distribution plate.

Another subject of the invention relates to a downflow catalytic reactor having a chamber containing at least two fixed catalyst beds separated by an intermediate zone having a device for mixing and distributing fluids according to the invention.

Brief Description of the Drawings

FIG. 1c is a perspective view of the mixing zone (B) of the device according to FIG. 1a.

DETAILED DESCRIPTION OF THE INVENTION

Definitions

Within the meaning of the invention, a mixing chamber is understood to mean the space in which the mixing between a reaction fluid and a quench fluid is effected. An exchange chamber is understood to mean the space in which a mixed reaction fluid and quench fluid are in direct contact with a distribution zone for the fluids via at least one longitudinal opening, and optionally lateral passage sections.

Detailed Description

The compact mixing and distribution device according to the invention is used in a reactor in which exothermic reactions such as hydrotreating, hydrodesulfurization, hydrodenitrogenation, hydrocracking, hydrogenation, hydrodeoxygenation, hydroisomerization, hydrodewaxing or hydrodearomatization reactions are carried out. Generally, the reactor has a shape that is elongate along a substantially vertical axis. At least one reaction fluid (also referred to as "process fluid") is made to flow from the top of said reactor to the bottom through at least one fixed catalyst bed. Advantageously, at the outlet of each bed apart from the last one, the reaction fluid is collected and then mixed with a quench fluid in said device before being distributed onto the catalyst bed situated downstream of a distribution plate. Downstream and upstream are defined with respect to the direction of flow of the reaction fluid. The reaction fluid may be a gas or a liquid or a mixture containing liquid and gas; this depends on the type of reaction carried out in the reactor.

Figure 1A:
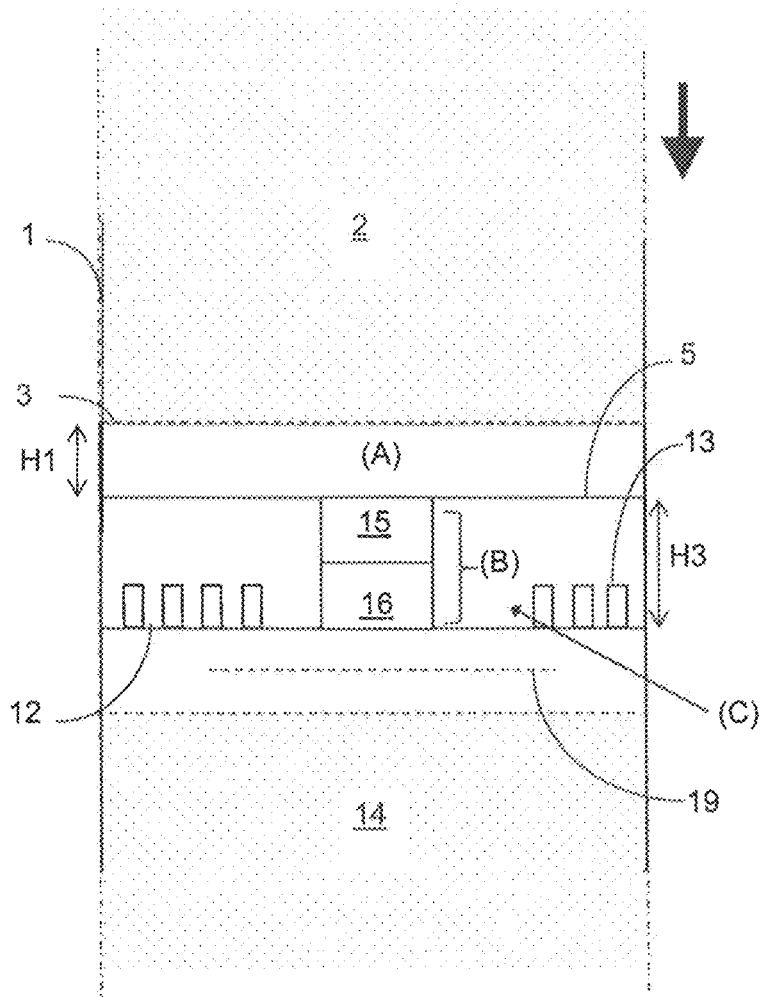
FIG. 1a depicts an axial section through a downflow catalytic reactor comprising at least two beds of solid catalyst, and comprising a compact device for mixing and distributing fluids as described in document FR 3 034 323.
Figure 1B:
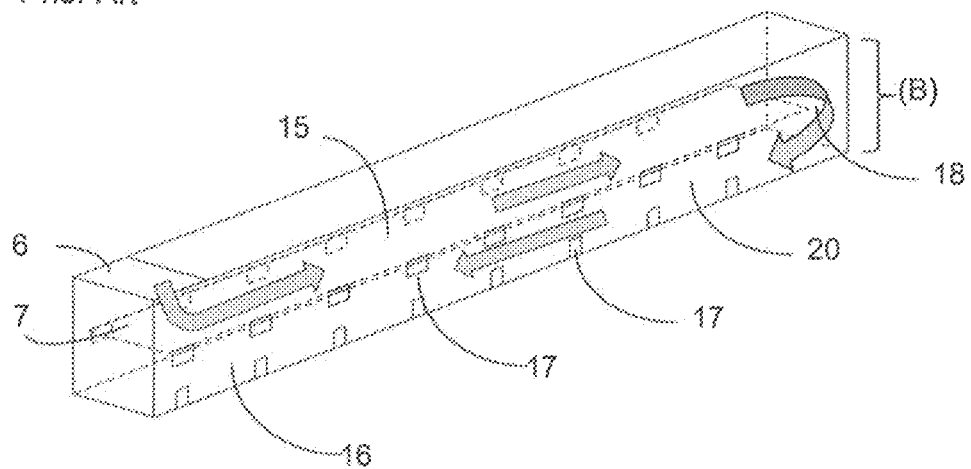
FIG. 1b respectively depicts a detailed view of the mixing zone (B) of the device according to FIG. 1a (the dotted lines depict the parts of the mixing zone that are not visible, i.e. that are situated inside said zone).
Figure 1C:
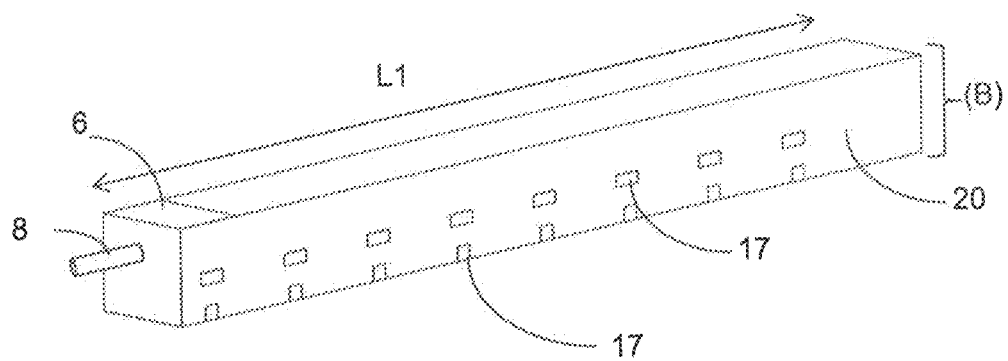

With reference to FIGS. 1a to 1c, the mixing and distribution device according to the prior art may be disposed in a reactor 1 of a shape that is elongate along a substantially vertical axis in which at least one reaction fluid is made to flow from top to bottom through at least one catalyst bed 2. The device is disposed under the catalyst bed 2, relative to the direction of flow of the reaction fluid in the chamber 1. A support grating 3 makes it possible to support the catalyst bed 2 so as to free up a collecting zone (A) disposed under the catalyst bed 2. The collecting zone (A) is necessary to allow the reaction fluid to drain down to a collecting pipe 7 (cf. FIGS. 1b and 1c). The reaction fluid which flows is made up for example of a gas phase and of a liquid phase. The reaction fluid passing through the catalyst bed 2 is collected by a substantially horizontal collecting means 5 (also referred to here as collecting baffle) leading to a substantially vertical collecting pipe 7, disposed either underneath the collecting zone (A) in a zone referred to as mixing zone (B) (as depicted in FIGS. 1b and 1c), or in the collecting zone (A) (not depicted in the figures). Substantially vertical and substantially horizontal are understood, within the meaning of the present invention, to mean a variation of a plane with the vertical or the horizon, respectively, by an angle β of between ±5 degrees. The collecting means 5 (cf. FIG. 1a) is made up of a solid plate disposed in the plane perpendicular to the longitudinal axis of the chamber under the support grating 3 of the catalyst bed 2. The plate of the collecting means 5 extends radially over the entire surface area of the reactor 1. It has, at one of its ends, an opening 6 (cf. FIGS. 1b and 1c) to which said collecting pipe 7 is connected. The collecting means 5 makes it possible to collect the flow of reaction fluid coming from the upstream catalyst bed 2 and to direct it toward said collecting pipe 7. The collecting means 5 is spaced away from the support grating 3 of the catalyst bed 2 by a height H1 (FIG. 1a). The height H1 is chosen so as to limit the pressure drop during the collection of the fluid flowing from the catalyst bed 2 and to limit the depth of liquid seal, i.e. the height formed by the liquid that has accumulated in the collecting means 5. The depth of liquid seal does not change the drainage of the reaction fluid to the collecting pipe 7, or its flow through this pipe, or its flow through the upper catalyst bed 2. When the collecting pipe 7 and the injection means 8 (FIG. 1c) are situated at the level of the mixing zone (B), the height H1 is between 10 and 500 mm, preferably between 10 and 200 mm, more preferably between 30 and 150 mm, even more preferably between 40 and 100 mm. Thus, the reaction fluid coming from the bed 2 is forced, in the collecting zone (A), to pass through the collecting pipe 7. When the collecting pipe 7 and the injection means 8 are situated at the level of the collecting zone (A), the height H1 is between 10 and 400 mm, preferably between 30 and 300 mm, and even more preferably between 50 and 250 mm.

Located beneath the collecting zone (A) are a mixing zone (B) and a distribution zone (C). With reference to FIGS. 1b to 1c, the mixing zone (B) comprises a substantially vertical collecting pipe 7 that is able to receive the reaction fluid collected by the collecting means 5 and the quench fluid coming from the injection means 8 (cf. FIG. 1c) opening into said collecting pipe 7.

The mixing zone (B) further comprises a mixing chamber 15, of length L1 (cf. FIGS. 1a to 1c), situated downstream of the collecting means 5 in the direction of flow of the fluids. The collecting pipe 7, which is in communication with the mixing chamber 15, may be situated above the mixing chamber 15 or at the same level as said chamber. Preferably, the collecting pipe 7 is situated at the same level as the mixing chamber 15 (cf. notably FIG. 1b). Similarly, the injection pipe 8 can open out above the mixing chamber 15, at the same level as said chamber, or directly into the interior of said mixing chamber 15 via a device known to a person skilled in the art, for example a perforated tube passing through the mixing chamber 15. The quench fluid may be injected in a cocurrent, cross-current, or else countercurrent manner with respect to the reaction fluid coming from the collecting zone (A).

The distribution zone (C) for its part comprises a distribution plate 12 supporting a plurality of chimneys 13. The distribution zone (C), extending over a height H3 (cf. FIG. 1a), comprises a distribution plate 12 (also referred to here as a distributor plate or distribution plate) and a plurality of chimneys 13. More specifically, the chimneys 13 are open at their upper end via an upper opening and have, along their lateral wall, a series of lateral orifices intended for the separate passage of the liquid phase (through the orifices) and the gas phase (through the upper opening) inside the chimneys 13, so as to effect the intimate mixing thereof inside said chimneys 13. The shape of the lateral orifices may be highly variable, generally circular or rectangular, these orifices being preferably distributed over each of the chimneys at several levels that are substantially identical from one chimney to another, generally at least one level, and preferably 1 to 10 levels, so as to allow the establishment of an interface that is as uniform as possible between the gas phase and the liquid phase.

One feature of the device according to the prior art lies in the installation of the mixing zone (B) at the same level as the distribution zone (C), and in the fact that said mixing zone (B) is made up of a fluid mixing chamber 15 connected to and in communication with a fluid exchange chamber 16, of the same length L1 as the mixing chamber 15, (cf. FIGS. 1a to 1c), said exchange chamber 16 being situated downstream of the mixing chamber 15 in the direction of flow of the fluids. More particularly, the exchange chamber 16 is situated beneath the mixing chamber 15.

The fluids pass from the mixing chamber 15 to the exchange chamber 16 via an opening 18 situated at the fluid outlet end of the mixing chamber 15 in the direction of flow of the fluids (as indicated by the arrows in FIG. 1b). What is meant by a mixing chamber 15 is the space in which the mixing between the reaction fluid and the quench fluid is effected. What is meant by an exchange chamber 16 is the space in which the mixed reaction fluid and quench fluid are in direct contact with the distribution zone (C) via lateral passage sections 17. With reference to FIGS. 1a to 1c, the exchange chamber 16 comprises, on its lateral walls 20, lateral passage sections 17 suitable for the passage of the fluids from the mixing zone (B) to the distribution zone (C). Thus, only the exchange chamber 16 is in direct contact with the distribution zone (C).

However, when either the quench fluid or the reaction fluid is of the gas type, the use of too great a gas flow rate may drive fluids of liquid type or mixtures of the liquid/gas type onto the distribution plate 12 and thus dry certain zones of said plate. As a result, the chimneys 13 of the distribution plate 12 will not all be fed in an equivalent manner and this may result in imbalance in the flow rate and distribution at the catalyst bed 14 situated downstream of the distribution plate 12.

The Applicant Company has developed an improvement to the fluid mixing and distribution device according to the prior art that makes it possible to alleviate this disadvantage, without in so doing modifying the bulkiness of said device, by proposing a device comprising an exchange chamber that is elongated along the longitudinal axis (XX') with respect to the mixing chamber so as to create a ceiling comprising a longitudinal opening suited to the passage of the fluids from the exchange chamber to the distribution zone.

Figure 2A:
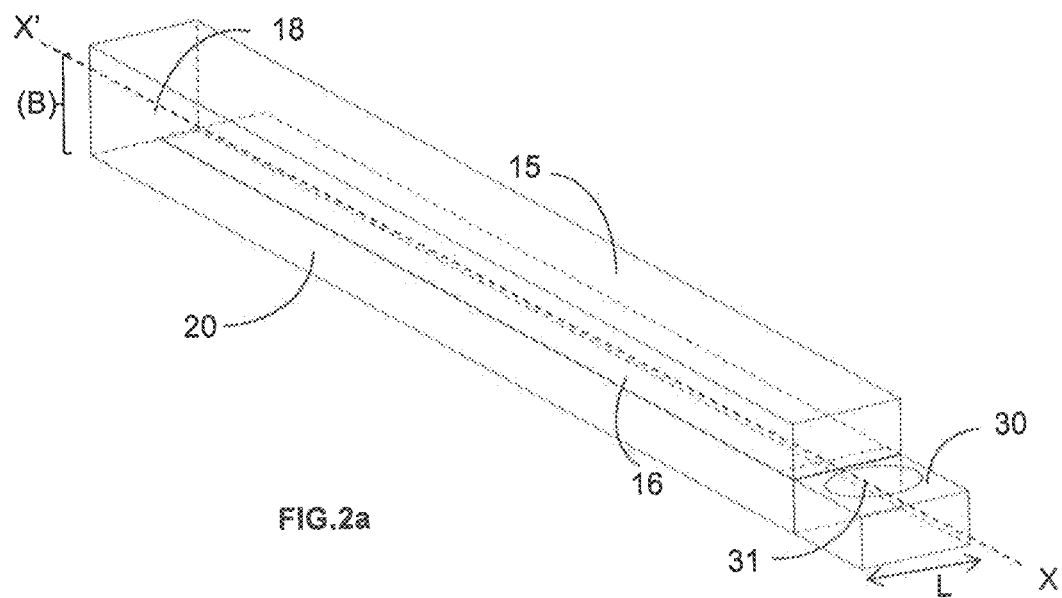
FIG. 2a is a perspective view of the mixing zone (B) of the device according to the invention.
Figure 2B:
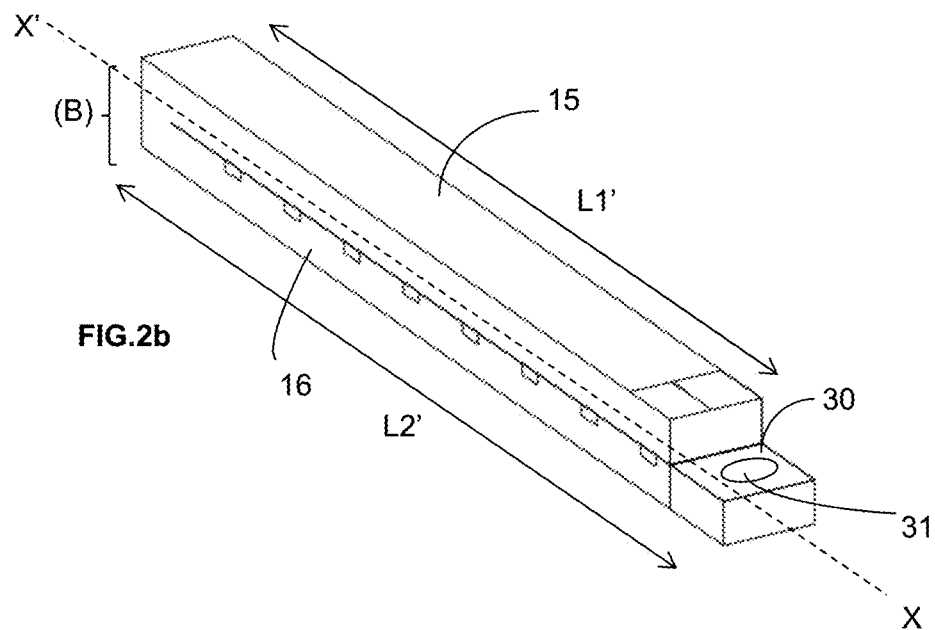
FIG. 2b depicts a perspective view of the mixing zone (B) of the device according to the invention comprising lateral passage sections.

With reference to FIGS. 2a to 2b, the fluid mixing and distribution device according to the invention comprises a mixing zone (B) comprising a substantially vertical collecting pipe 7 that is able to receive the reaction fluid collected by the collecting means (not depicted in the figures) and the quench fluid coming from the injection means 8 opening into said collecting pipe 7. The mixing zone (B) comprises a mixing chamber 15, of length L1', situated downstream of the collecting means in the direction of flow of the fluids. The cross section of the mixing chamber 15 is rectangular. The collecting pipe 7, which is in communication with the mixing chamber 15, may be situated above the mixing chamber 15 or be contained in said mixing chamber 15. Preferably, the collecting pipe 7 is contained in the mixing chamber 15. Similarly, the injection pipe 8 can open out above the mixing chamber 15, at the same level as said chamber, or directly into the interior of said mixing chamber 15 via a device known to a person skilled in the art, for example a perforated tube passing through the mixing zone 15.

The quench fluid may be injected in a cocurrent, crosscurrent, or countercurrent manner with respect to the reaction fluid coming from the collecting zone (A). The mixing zone (B) also comprises a fluid exchange chamber 16, of length L2', the exchange chamber 16 being situated downstream of the mixing chamber 15 in the direction of flow of the fluids. The cross section of the exchange chamber 16 is rectangular. According to the invention, the exchange chamber 16 is situated beneath the mixing chamber 15, and is preferably superposed with the mixing chamber 15. The fluids pass from the mixing chamber 15 to the exchange chamber 16 via an opening 18 situated at the outlet end of the mixing chamber 15 in the direction of flow of the fluids. The configuration of the mixing zone (B) makes it possible for the fluids to be mixed in the mixing chamber 15 and for said mixture to flow to the exchange chamber 16. The reaction fluid and the quench fluid continue to mix in the exchange chamber 16.

According to one essential aspect of the invention, the length L2' of the exchange chamber 16 is strictly greater than the length L1' of the mixing chamber 15 so as to create a ceiling 30 on said exchange chamber 16, said ceiling 30 comprising at least one longitudinal opening 31 suitable for the passage of the fluids from said exchange chamber 16 to said distribution zone (C). Such an arrangement of the device according to the invention makes it possible, by creating a longitudinal opening 31 in the exchange chamber, to better manage the rate of flow of the fluids, notably of the gas type, leaving the exchange chamber 16, and thus to limit the impact of the flow rate of the fluids on the distribution plate 12 of the distribution zone (C). Preferably, the ratio between the length L1' of the mixing chamber 15 and the length L2' of the exchange chamber 16 is between 0.1 and 0.9, preferably between 0.3 and 0.9. Advantageously, the ratio between the surface area of the ceiling 30 and the surface area of the longitudinal opening(s) is between 0.2 and 1, preferably between 0.3 and 0.8. In one particular embodiment according to the invention, the ratio between the surface area of the ceiling 30 and the surface area of said longitudinal opening 31 is equal to 1, meaning that the ceiling 30 is completely open over the distribution zone (C).

Figure 2C:
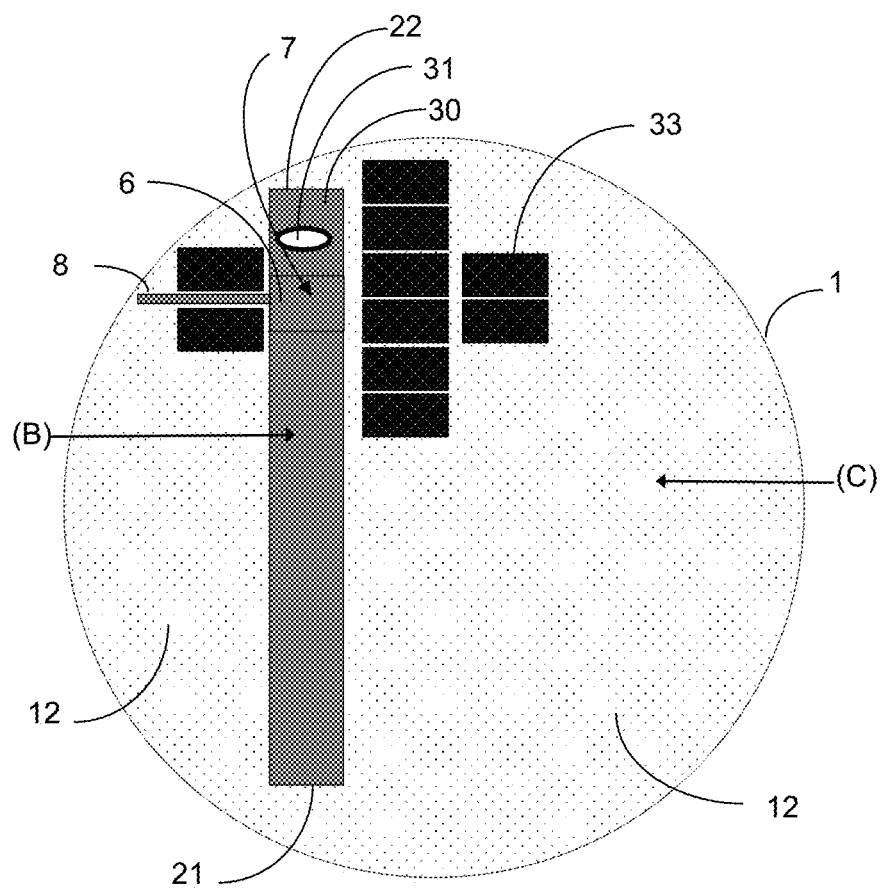
FIG. 2c depicts a transverse cross section through the device according to the invention, said device comprising a plurality of horizontal panels 33.
Figure 2D:
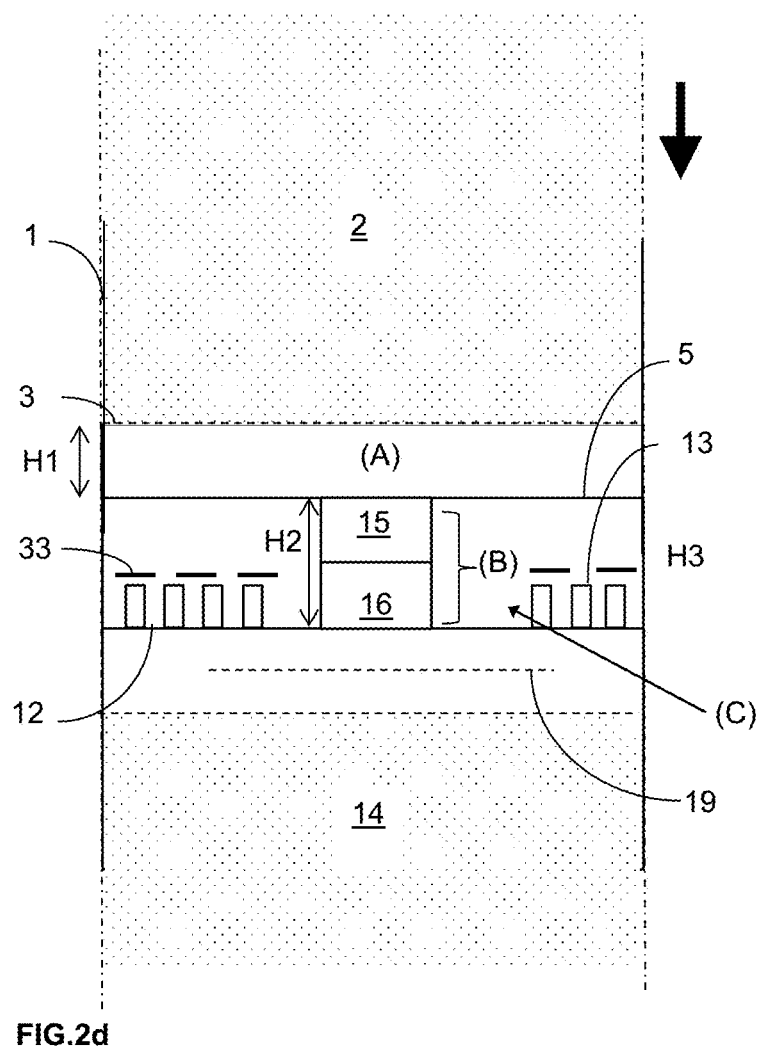
FIG. 2d depicts an axial section through a downflow catalytic reactor comprising at least two beds of solid catalyst, and comprising a compact device for mixing and distributing fluids according to the invention.

In order to ensure a homogeneous distribution of the fluids over the distribution plate 12, the device according to the invention advantageously comprises a plurality of horizontal panels 33 (cf. FIG. 2c) that are situated in the distribution zone (C), beneath the opening 31 in the ceiling 30 of the exchange chamber 16 but above the chimneys 13 or are positioned over the chimneys 13 of the distribution plate 12 (cf. FIG. 2d). Said horizontal panels 33 are preferably spaced apart from one another by a distance of between 0 and 5 cm, preferably between 0.5 and 1 cm, so as to allow the fluids to flow to the space situated between the horizontal panels 33 and the distribution plate 12. Preferably, said horizontal panels 33 are situated at a height of between 0 and 10 cm from the chimneys 13 of the distribution plate 12. When the horizontal panels are placed over the chimneys of the distribution plate, the latter are configured so as to allow the passage of fluids of the gas type, for example by having a beveled end. The horizontal panels 33 occupy a surface area of between 5 and 95% with respect to the radial service area of the reactor, preferably between 5 and 30%. Such an arrangement of the device according to the invention makes it possible to ensure good effectiveness of mixing of the fluids without otherwise causing an increase in the bulkiness of said device. In one particular embodiment according to the invention, the horizontal panels 33 comprise a plurality of perforations that allow the fluids to flow to the space situated between the horizontal panels 33 and the distribution plate 12. For each horizontal panel 33, the surface area taken up by said perforations is between 1 and 20% of the surface area, preferably between 2 and 5% of the surface area, relative to the total surface area of the horizontal panel 33.

In one particular embodiment, the exchange chamber 16 may also comprise, on its lateral walls 20, lateral passage sections 17 suitable for the passage of the fluids from the mixing zone (B) to the distribution zone (C). In addition, the device may possibly also comprise at least one lateral deflector 32 (cf. FIG. 3) situated in said distribution zone (C) opposite the at least one lateral passage section 17. Preferably, the device comprises at least one pair of lateral deflectors 32 that are situated in the distribution zone (C) one on each side of the exchange chamber 16 opposite the lateral passage sections 17.

Figure 3:
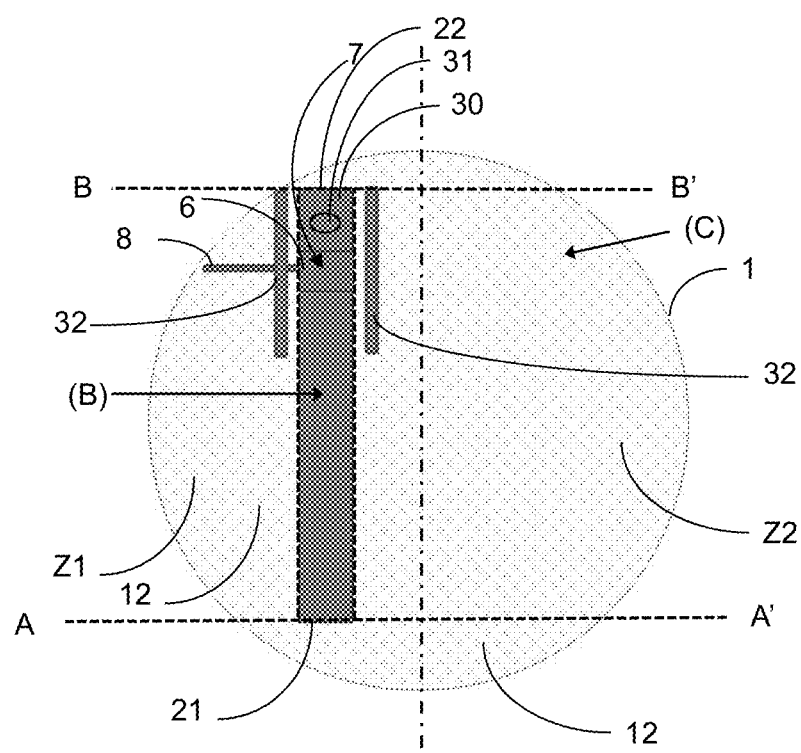
FIG. 3 depicts a transverse cross section through the device according to the invention according to one particular embodiment. The mixing zone (B) is off-center with respect to the central axis of the distribution zone (C), thus forming a distribution plate 12 comprising two zones, Z1 and Z2, with different surface areas.

Advantageously, the mixing zone (B), i.e. the mixing chamber 15 and the exchange chamber 16, is off-center with respect to the center of the distribution zone (C) (cf. FIG. 3). This offset of the mixing zone with respect to the center of the distribution zone has the advantage of making operations of inspecting and maintaining the device easier. This particular configuration of the device divides the distribution plate 12 into two zones Z1 and Z2 with different surface areas, where Z1<Z2 (cf. FIG. 3). The zones Z1 and Z2 are defined, respectively, as the surface area of the distribution plate 12 comprised between the lateral wall 20 of the exchange chamber 16, the periphery of the chamber 1 of the reactor, and the two axes AA' and BB' (cf. FIG. 3) passing through the ends 21 and 22 of the exchange chamber 16, respectively (it being understood that Z1<Z2). R is defined as being the ratio between the surface area of the zone Z1 and of the zone Z2 (R=Z1/Z2), it being understood that R is between 0 and 1, excluding the values 0 and 1.

Thus, when the device according to the invention comprises lateral passage sections 17, and in order to ensure good distribution of the fluids over the two zones Z1 and Z2 of the distribution plate 12, the flow rate of the fluids passing through the lateral passage sections 17 of the exchange chamber 16 has been adapted as a function of the ratio R. Let Sp be the total surface area of the lateral passage sections 17 of the lateral wall 20 opposite the zone Z1 of the distribution plate 12 (i.e. on the side where the surface area of the distribution plate is smallest) and Sg be the total surface area of the lateral passage sections 17 of the lateral wall 20 opposite the zone Z2 of the distribution plate 12 (i.e. on the side where the surface area of the distribution plate is greatest). According to the invention, good distribution of the fluids over the two zones of the distribution plate is obtained if the ratio R' between the surfaces areas Sp/Sg is between 0.5 and 1.5, preferably between 0.6 and 1.4.

Specifically, in the absence of particular distribution means at the outlet of the exchange chamber 16, the two zones Z1 and Z2 of the distribution plate 12 are fed by identical fluid flow rates, resulting in poor distribution of the fluids, and thus causing a significant loss in the distribution performance of the distribution of the fluids over the distribution plate 12. When it comprises lateral passage sections 17 on the walls 20 of the exchange chamber 16, the total surface area of said sections differing depending on whether the side in question is the one on which the distribution surface area is smallest (Z1) or greatest (Z2), the device according to the invention makes it possible generate, at the outlet of the exchange chamber 16, pressure drops that make it possible to alter the fluid flow rates according to the ratio R (R=Z1/Z2).

Figure 4:
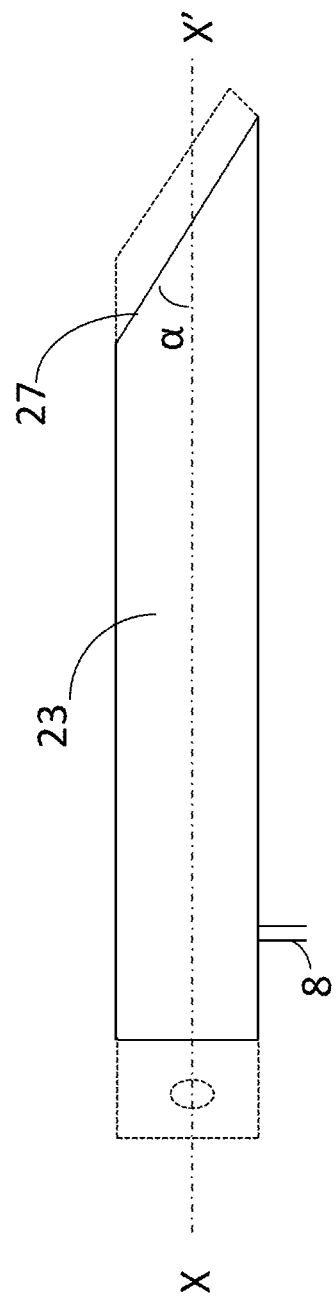
FIG. 4 depicts a view in section on the axis (XX') of the mixing zone (B) of the device according to the invention, as depicted in FIG. 2b.

Advantageously, the bottom 23 of the mixing chamber 15 (cf. FIG. 4) may comprise an end edge 27 that has a beveled shape and forms an angle θ of between 20° and 70°, preferably between 30° and 60°, and even more preferably between 30° and 45°, with the longitudinal axis XX' of the mixing chamber 15. Such a shape of the end edge of the mixing chamber 15 makes it possible to create a flow of the fluids of the swirling type at the opening 18, having the effect of improving the effectiveness of the mixing of the fluids, notably by allowing mutual mixing of the stream lines of the fluids that are situated on either side of the lateral walls of the mixing chamber 15. In addition, such a configuration of the mixing chamber 15 has the effect of reducing the speed of the fluids between the mixing chamber and the exchange chamber. As a result of the fluid speeds at being reduced, the pressure drop is minimized.

Advantageously, the ends of the mixing chamber 15 and exchange chamber 16 are not in contact with the wall of the chamber of the reactor 1, so as to allow the flow of the fluids over the distribution plate 12 on either side of the mixing chamber 15 and exchange chamber 16. Advantageously, the mixing chamber 15 and the exchange chamber(s) 16 form one part.

The cumulative total height H2 of said mixing chamber 15 and of said exchange chamber 16 is between 200 and 1500 mm, preferably between 200 and 800 mm, more preferably between 300 and 750 mm, and even more preferably between 350 and 700 mm.

Preferably, the width "L" (cf. FIG. 2a) of the exchange chamber 16 is between 200 and 1100 mm, preferably between 200 and 800 mm, more preferably between 250 and 700 mm, and even more preferably between 300 and 600 mm.

The ratio of the volumes (in %) between the exchange chamber(s) 16 and the mixing chamber 15 is between 5 and 60%, preferably between 10 and 60%, and even more preferably between 15 and 40%.

In one embodiment according to the invention, the exchange chamber 16 is positioned directly on the distribution plate 12 (as shown for example in FIG. 1 for example). In another embodiment (not depicted in the figures), the exchange chamber 16 is situated at a distance "d" from said distribution plate 12, preferably of between 20 and 150 mm, and more preferably between 30 and 80 mm. The space comprised beneath the distribution plate 12 and the exchange chamber 16 allows the distribution of the fluids over the entire surface area of said distribution plate 12 and therefore makes it possible to make the distribution of the mixture of the fluids homogeneous over the entire section of the reactor above the catalyst bed 14 situated downstream of the mixing and distribution device, in the direction of flow of the fluids (cf. notably FIG. 1). In this embodiment, the exchange chamber 16 may comprise, in its lower part, longitudinal passage sections in order that the mixture of fluids can flow onto the distribution plate 12. Of course, the number, shape and size of the longitudinal passage sections are chosen such that a minority fraction of the flow of fluid mixture passes through said longitudinal passage sections. The longitudinal passage sections may just as well be in the form of orifices and/or of slots.

A dispersion system may be positioned beneath the distribution plate 12, so as to distribute the fluids uniformly over the catalyst bed 14 situated downstream of said system. The dispersion system 19 (cf. FIG. 1) may comprise one or more dispersion devices that may be associated with each chimney 13, be shared between several chimneys 13, or else be shared between all the chimneys 13 of the distribution plate 12. Each dispersion device 19 has a substantially flat and horizontal geometry, but may have a perimeter of any shape. Furthermore, each dispersion device 19 may be situated at different heights. Advantageously, said dispersion device is in the form of gratings, and/or may optionally comprise deflectors. Advantageously, the axis of the grating (s) 19 is preferably perpendicular to the longitudinal axis of the chamber of the reactor in order to improve the distribution of the mixture of fluids over the entire radial cross section of the chamber of the reactor. The distance between the dispersion system and the bed of solid granules that is situated immediately beneath is chosen so as to preserve the mixture state of the gaseous and liquid phases as far as possible as it is at the outlet of the chimneys 13.

Preferably, the distance between the distribution plate 12 and the catalyst bed 14 situated beneath said distribution plate is between 50 and 400 mm, preferably between 100 and 300 mm. The distance between the distribution plate 12 and said dispersion device 19 is between 0 and 400 mm, preferably between 0 and 300 mm. In one particular embodiment, the distribution plate 12 is positioned on the dispersion device 19.

Compared with the devices described in the prior art, and even more particularly compared with the device disclosed in the document FR 3 034 323, the mixing and distribution device according to the invention has the following advantages:
  good compactness on account of the integration, at the same height, of the fluid mixing zone and of the fluid distribution zone;
  good thermal efficiency and good effectiveness of mixing of the fluids;
    good distribution of the fluids over the distribution plate 12, on account of the presence of a longitudinal opening 31 in the exchange box 16 and of a plurality of horizontal panels 33 situated above the longitudinal opening 31 in the exchange box 16, and above the chimneys 13 or over the chimneys 13 of the distribution plate 12.

The invention claimed is:
1. A device for mixing and distributing fluids for a downflow catalytic reactor, said device comprising:
  at least one collecting zone (A) comprising at least one collecting means (5);
  at least one substantially vertical collecting pipe (7) that is able to receive a reaction fluid collected by said collecting means (5) and at least one injection means (8) opening into said collecting pipe (7) in order to inject a quench fluid;
  at least one mixing zone (B), situated downstream of said collecting pipe (7) in the direction of flow of the fluids, said mixing zone (B) comprising at least one fluid mixing chamber (15) of length L1', said mixing zone (15) comprising a first end in communication with said collecting pipe (7) and a second end in communication with a fluid exchange chamber (16) of length L2', situated underneath and superposed with said mixing chamber (15);
  at least one distribution zone (C) situated at the same level as the mixing zone (B), downstream of said mixing zone (B) in the direction of flow of the fluids, said distribution zone (C) comprising a distribution plate (12) supporting a plurality of chimneys (13);

wherein the length L2' of said exchange chamber (16) is greater than the length L1' of said mixing chamber (15) so as to create a ceiling (30) on said exchange chamber (16), said ceiling (30) comprising at least one longitudinal opening (31) suitable for the passage of the fluids from said exchange chamber (16) to said distribution zone (C).

2. The device as claimed in claim 1, wherein the ratio between the length L1' of the mixing chamber (15) and the length L2' of the exchange chamber (16) is between 0.1 and 0.9.

3. The device as claimed in claim 1, wherein the ratio between the surface area of the ceiling (30), not including the surface area of the longitudinal opening(s) (31), and the surface area of the longitudinal opening(s) (31) is between 0.2 and 1.

4. The device as claimed in claim 3, wherein the ratio between the surface area of the ceiling (30), not including the surface area of the longitudinal opening(s) (31), and the surface area of the longitudinal opening(s) (31) is equal to 1.

5. The device as claimed in claim 1, further comprising at least one plurality of horizontal panels (33) situated in the distribution zone (C), underneath the opening (31) in the ceiling (30) of the exchange chamber (16), and above the chimneys (13) or over the chimneys (13) of the distribution plate (12).

6. The device as claimed in claim 5, wherein said horizontal panels (33) are situated at a height of between 0 and 10 cm above the chimneys (13) of the distribution plate (12).

7. The device as claimed in claim 5, wherein said horizontal panels (33) are spaced apart from one another by a distance of between 0 and 5 cm.

8. The device as claimed in claim 1, wherein said exchange chamber (16) also comprises, on lateral walls (20) thereof, a plurality of lateral passage sections (17) suitable for the passage of the fluids from said exchange chamber (16) to said distribution zone (C).

9. The device as claimed in claim 8, further comprising at least one lateral deflector (32) situated in said distribution zone (C) opposite at least one lateral passage section (17).

10. The device as claimed in claim 8, further comprising a pair of lateral deflectors (32) situated one on each side of the exchange chamber (16).

11. The device as claimed in claim 1, wherein said mixing zone (B) is off-center with respect to the central axis of the distribution zone (C), forming on the distribution plate (12) two zones (Z1) and (Z2) of which the ratio R, defined as the ratio between the surface area of the zone (Z1) and the zone (Z2), is between 0 and 1, excluding the values 0 and 1.

12. The device as claimed in claim 1, wherein the mixing chamber (15) comprises a bottom (23) having an end edge (27) that has a beveled shape and forms an angle $\theta$ of between 20° and 70° with the longitudinal axis XX' of the mixing chamber (15).

13. The device as claimed in claim 1, wherein the volume ratio between said mixing chamber (15) and said exchange chamber (16) is between 5 and 60%.

14. The device as claimed in claim 1, wherein the exchange chamber (16) is situated at a distance "d" of between 20 and 150 mm away from said distribution plate (12).

15. A downflow catalytic reactor having a chamber (1) containing at least two fixed catalyst beds (2, 14) separated by an intermediate zone having a device for mixing and distributing fluids as claimed in claim 1.

16. The device as claimed in claim 1, wherein the ratio between the length L1' of the mixing chamber (15) and the length L2' of the exchange chamber (16) is between 0.3 and 0.9.

17. The device as claimed in claim 1, wherein the ratio between the surface area of the ceiling (30), not including the surface area of the longitudinal opening(s) (31), and the surface area of the longitudinal opening(s) (31) is between 0.3 and 0.8.

18. The device as claimed in claim 5, wherein said horizontal panels (33) are spaced apart from one another by a distance of between 0.5 and 1 cm.

19. The device as claimed in claim 12, wherein the end edge (27) forms an angle $\theta$ of between 30° and 60° with the longitudinal axis XX' of the mixing chamber (15).

20. The device as claimed in claim 1, wherein the volume ratio between said mixing chamber (15) and said exchange chamber (16) is between 10 and 60%.

* * * * *